(12) United States Patent
Pahud et al.

(10) Patent No.: US 9,878,410 B2
(45) Date of Patent: Jan. 30, 2018

(54) DEVICE FOR WORKPIECE CENTERING

(71) Applicant: Rollomatic S.A., Le Landeron (CH)

(72) Inventors: Pierre Pahud, La Neuveville (CH); Christian Krumm, Cortébert (CH)

(73) Assignee: Rollomatic S.A., Le Landeron (CH)

( * ) Notice: Subject to any disclaimer, the term of this patent is extended or adjusted under 35 U.S.C. 154(b) by 0 days.

(21) Appl. No.: 14/773,962

(22) PCT Filed: Mar. 19, 2014

(86) PCT No.: PCT/EP2014/055558
§ 371 (c)(1),
(2) Date: Sep. 9, 2015

(87) PCT Pub. No.: WO2014/147157
PCT Pub. Date: Sep. 25, 2014

(65) Prior Publication Data
US 2016/0023313 A1   Jan. 28, 2016

(30) Foreign Application Priority Data

Mar. 20, 2013  (EP) .................................... 13001443
Sep. 5, 2013  (EP) .................................... 13183204

(51) Int. Cl.
| B23Q 1/76 | (2006.01) |
| B23B 31/12 | (2006.01) |
| B23B 25/00 | (2006.01) |

(52) U.S. Cl.
CPC .............. *B23Q 1/76* (2013.01); *B23B 25/00* (2013.01); *B23B 31/1269* (2013.01)

(58) Field of Classification Search
CPC ....... B23B 31/1269; B23B 25/00; B23Q 1/76; B23Q 2210/006
(Continued)

(56) References Cited

U.S. PATENT DOCUMENTS 2,769,466 A    11/1956 Brauneis
3,512,561 A *  5/1970 Cortez ................. B23Q 35/102
                                                  142/37
(Continued)

FOREIGN PATENT DOCUMENTS

DE    604964 C    11/1934
DE    721 402 C   6/1942
(Continued)

OTHER PUBLICATIONS

International Search Report of PCT/EP2014/055558, dated May 23, 2014.

*Primary Examiner* — Sara Addisu
(74) *Attorney, Agent, or Firm* — Collard & Roe, P.C.

(57) ABSTRACT

A device for centering a longitudinal workpiece fixed on a spindle includes a support body linearly displaced along a support body axis. The support body and support body axis are aligned substantially parallel to an axis of rotation of the spindle. A first support element movably arranged on the body supports the workpiece or a workpiece receiving part, and a second support element movably arranged on the body supports the workpiece or a workpiece receiving part. The first support element can be linearly displaced in a first direction and is rotatably arranged about a first axis of rotation on the support body and the second support element can be linearly displaced in a second direction different from the first direction and is rotatably arranged about a second axis of rotation on the support body.

16 Claims, 16 Drawing Sheets

Figure 1:
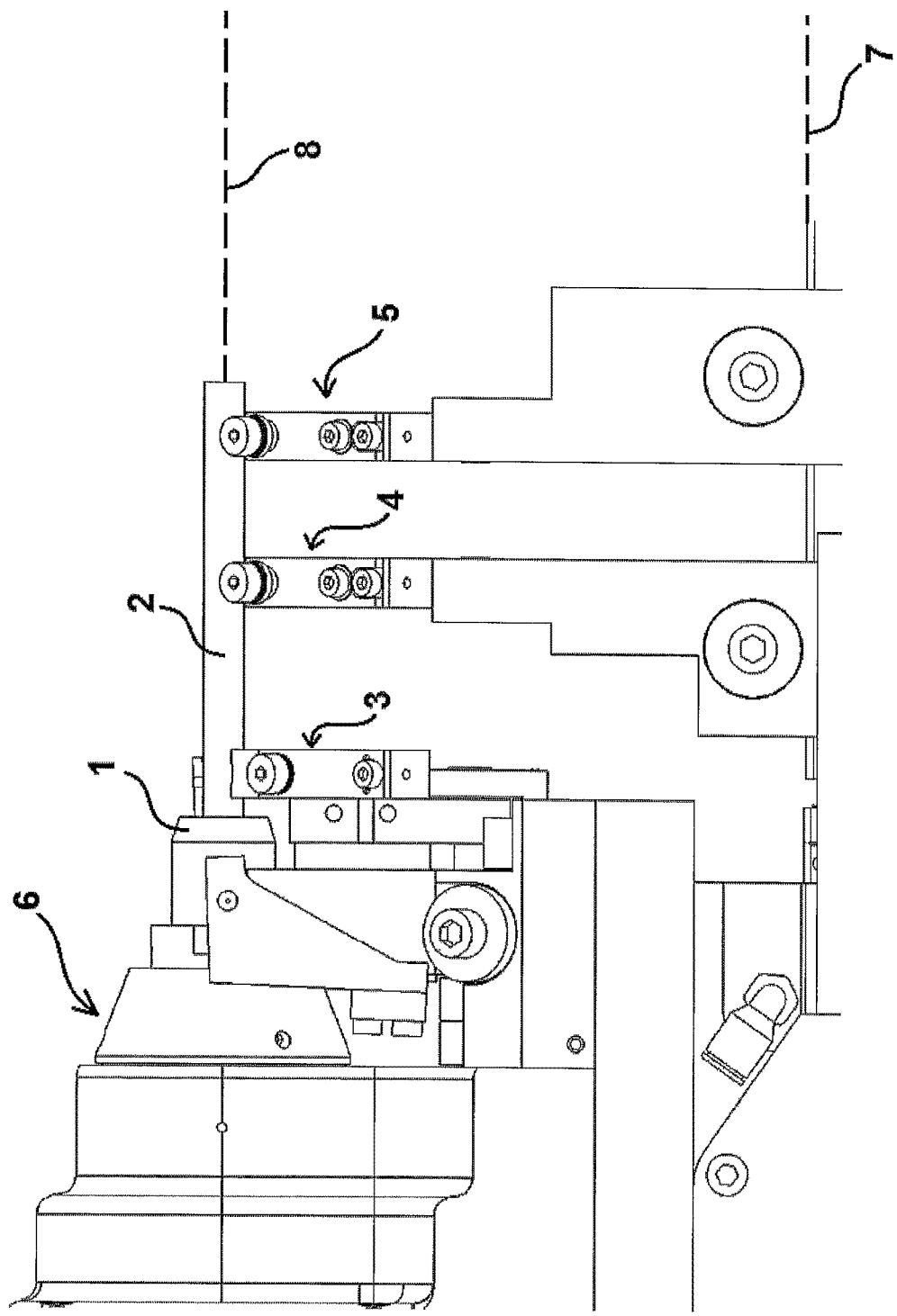

(58) Field of Classification Search
USPC .......................................... 82/164, 152, 162
See application file for complete search history.

(56) References Cited

U.S. PATENT DOCUMENTS

| | | | | |
|---|---|---|---|---|
| 4,588,005 | A * | 5/1986 | Sliker | B23Q 1/623 |
| | | | | 142/38 |
| 4,671,150 | A * | 6/1987 | Harris | B23D 21/02 |
| | | | | 83/355 |
| 6,065,378 | A * | 5/2000 | Ricci | B23B 5/08 |
| | | | | 82/113 |
| 6,799,494 | B1 | 10/2004 | Ricci et al. | |
| 7,398,716 | B2 * | 7/2008 | Quigley | B26D 3/161 |
| | | | | 82/101 |
| 7,770,498 | B2 * | 8/2010 | Sorensen | B23B 29/022 |
| | | | | 408/181 |

FOREIGN PATENT DOCUMENTS

| | | |
|---|---|---|
| EP | 2433742 A1 | 3/2012 |
| EP | 2433742 B1 | 11/2014 |
| JP | S62144137 U | 9/1987 |
| JP | H0322805 U | 3/1991 |
| JP | H10202486 A | 8/1998 |

\* cited by examiner

DEVICE FOR WORKPIECE CENTERING

CROSS REFERENCE TO RELATED APPLICATIONS

This application is the National Stage of PCT/EP2014/055558 filed on Mar. 19, 2014, which claims priority under 35 U.S.C. §119 of European Application No: EP 13001443.4 filed on Mar. 20, 2013 and EP 13183204.0 filed on Sep. 5, 2013, the disclosures of which are incorporated by reference. The international application under PCT article 21(2) was not published in English.

The invention derives from a device for workpiece centring of a workpiece arranged on a spindle.

Machine tools are generally equipped with a spindle on which a usually cylindrical workpiece to be machined is arranged. The workpiece is arranged in a workpiece interface of the spindle. The workpiece is clamped at the workpiece interface. To machine the workpiece with a tool, the workpiece is rotated by the spindle. Such machining includes, for example, chip-forming precision machining or grinding. To enable machining of the workpiece with high precision, the workpiece must be centred relative to the spindle. Here, the axis of rotation of the spindle and the longitudinal axis of the workpiece are brought into alignment. This avoids an imbalance or tumbling movement of the workpiece as it rotates. The workpiece interface must exhibit high repeat accuracy during centring. This means that when a workpiece is changed the same high precision when centring is always achieved. Devices for clamping and workpiece centring are used to that end.

Steady rests are a familiar device used to support long workpieces during turning. Such devices serve to prevent longer workpieces from sagging during machining. These devices exhibit three or more rests which, relative to the axis of rotation of the spindle, exert a force on the workpiece in the radial direction and grip the workpiece from various sides, in particular from below, above and the sides. They are preferably distributed at equal angular distances around a full circle, with the workpiece at the centre of the full circle. Here, the full circle lies in a plane that is perpendicular to the axis of rotation of the spindle. The position of the wear pads is adjustable.

In addition, there is the known workpiece centring solution of rests that are called half-moon or V-block. They exhibit a recess that extends in a longitudinal direction. The recess is open to one side and has a semi-circular or triangle cross-section. The workpiece lies against the rest around the recess and is positioned by it.

In order to centre the workpiece relative to the axis of rotation of the spindle, the familiar devices are moved perpendicular to the axis of rotation of the spindle, in the direction of an x-axis and a y-axis perpendicular to it. The x and y-axes are perpendicular to the axis of rotation of the spindle here. In addition the devices can normally be displaced parallel to the axis of rotation of the spindle. This corresponds to a movement in the direction of a z-axis which is perpendicular to both the x-axis and the y-axis.

A disadvantage in the case of the known devices is that although a rest for the workpiece moves perpendicular to the axis of rotation of the spindle, and workpiece offset parallel to the axis of rotation of the spindle can be compensated for, it is not possible to change the orientation of the rest relative to the axis of rotation of the spindle at the same time.

The invention is based on the task of providing a device for workpiece centring that enables better adjustment of the position of workpieces relative to an axis of rotation of the spindle, with high repeat accuracy, involving not only parallel displacement in directions that are perpendicular to each other but also tilting of a holder for the workpiece.

This task is solved by a device having the features of claim 1. The device exhibits a first support element, a second support element and a support body supporting both support elements. The first support element and the second support element together form a support for the workpiece or for an additional workpiece receiving part that receives the workpiece. If the workpiece or a workpiece receiving part that receives the workpiece is supported from below by the support elements, the support elements form a rest. However the support elements can also support a workpiece or a workpiece receiving part from the side or from above.

The two support elements support the workpiece in various directions so that the workpiece or an additional workpiece receiving part is supported from multiple sides as it rests on the support elements and its position is defined in the radial direction relative to the spindle axis.

The first and second support element can be arranged on the support body symmetrically to a vertical plane of symmetry.

The support body can be linearly displaced along a support body axis. Here, the support body can be aligned in such a way that the support body axis is substantially parallel to an axis of rotation of the spindle. The spacing between the support body and the spindle can be adjusted by displacing the support body along the support body axis. Here, the axis of rotation of the spindle and the support body axis for example form part of a common vertical plane.

The first support element is linearly displaceable in a first direction of displacement and arranged rotatably on the support body about a first axis of rotation. The second support element is linearly displaceable in a second direction of displacement that differs from the first direction of displacement, and arranged rotatably on the support body about a second axis of rotation. The two support elements are independent of each other. Their positions can be adjusted independently of each other. The first direction of displacement and the second direction of displacement in which the second support element is displaceable span two straight lines that intersect at an angle of more than 0° and less than 180°. They preferably intersect at an angle of 90°+/−45°. This corresponds to a range of angles from 45° to 135°.

The angle between the first axis of rotation and the support body axis is greater than 0° and smaller than 180°. The angle between the second axis of rotation and the support body axis is likewise greater than 0° and smaller than 180°. Neither the first axis of rotation nor the second axis of rotation are parallel to the support body axis.

The first support element exhibits a first elongated support section on which the workpiece or a workpiece receiving part that receives the workpiece rests. The second support element exhibits a second elongated support section on which the workpiece or a workpiece receiving part that receives the workpiece rests.

The first support section is therefore the section of the first support element that faces a workpiece or workpiece receiving part to be arranged. Correspondingly, the second support section is the section of the second support element that faces a workpiece or workpiece receiving part to be arranged. It is beneficial that the first support section and the second support section face each other. In a starting position of the first and second support element, the first support section and the second support section are aligned parallel to each other and parallel to the support body axis in their longitudinal direction. Relative to this starting position, the first support section and the second support section have greater expansion in a parallel direction to the support body axis than in a perpendicular direction to the support body axis.

If the support body is arranged with its support body axis parallel to an axis of rotation of a spindle, the support sections of the two support bodies form a support for a workpiece arranged on the spindle in the axial direction of the workpiece, relative to the axis of rotation of the spindle. Rather than being supported at individual points, as is the case with the devices known from prior art, the workpiece is instead supported in the axial direction over a certain distance that corresponds to the length of the support sections in their longitudinal direction. It is beneficial that the workpiece or a workpiece receiving body is supported over the same axial distance by the first and the second support section. It is beneficial that support is provided by the first and second support element in the axial direction over a distance that is in proportion to the diameter of the workpiece. The ratio of diameter of the workpiece to length of the two support sections in their longitudinal direction is preferably between 1:1 and 1:4. A ratio of substantially 1:3 is especially preferable.

It is beneficial that the two support sections are of equal length in their longitudinal direction.

It is beneficial that the first and the second support section are substantially at the same height in the direction of the support body axis. They are not offset relative to each other.

Advantageously the straight line of the first direction of displacement and the straight line of the second direction of displacement intersect at a point that lies on the axis of rotation of the spindle at a support body arranged on a spindle.

By displacing the first support element in the first direction of displacement and displacing the second support element in the second direction of displacement, the distance between the first support section and the axis of rotation of the spindle and between the second support section and the axis of rotation of the spindle is adjusted so that a workpiece arranged on the spindle rests on the first and second support sections and is supported by these.

By a rotation of the first support element about the first axis of rotation, the alignment of the first support section is adapted about its longitudinal axis to the alignment of the workpiece or workpiece receiving body arranged on the spindle in such a way that the first support section is parallel to the workpiece in the longitudinal direction, and the workpiece rests on the first support section along the longitudinal direction of the first support section. The same applies to a rotation of the second support element about the second axis of rotation. This has the result that the workpiece is supported by the first and second support element over a certain distance in the axial direction, and not simply at one point. The rest points are distributed over a distance in the axial direction.

This means that not only is it possible to adjust the position of a workpiece relative to a x and y-axis perpendicular to the axis of rotation of the spindle. The rotation of the support elements also allows adjustment of two angles and therefore rotating or tilting of the workpiece and the longitudinal axis of the workpiece in order to align the workpiece relative to the axis of rotation of the spindle.

Each of the two support elements exhibits a workpiece contact surface at the support sections. The workpiece touches the two support elements at these workpiece contact surfaces. If an additional workpiece receiving part is provided, the workpiece receiving part touches the two support elements at their workpiece contact surfaces. In this case the workpiece does not touch the support elements directly.

The above particulars as well as the particulars contained in the following text regarding the angles between the first direction of displacement, the second direction of displacement, the first axis of rotation, the second axis of rotation and the support body axis are based either on the corresponding straight lines intersecting or the straight lines being skew. In the case of skew straight lines, the angle corresponds to the angle of two straight lines that are parallel to the skew straight lines and pass through one point.

According to an advantageous embodiment of the invention, the two straight lines that reproduce the first direction of displacement and the second direction of displacement run in a plane that is perpendicular to the support body axis.

According to a further advantageous embodiment of the invention, the first axis of rotation is perpendicular to the first direction of displacement.

According to a further advantageous embodiment of the invention, the second axis of rotation is perpendicular to the second direction of displacement.

According to a further advantageous embodiment of the invention, the first support element exhibits a substantially level first workpiece contact surface and the second support element a substantially level second workpiece contact surface. The first workpiece contact surface is part of the surface of the first support section. The second workpiece contact surface is part of the surface of the second support section. The angle between the first workpiece contact surface and the second workpiece contact surface is greater than 0° and smaller than 180°. The first support element rest surface may be a continuous surface or comprise several surface sections. This applies analogously for the second support element rest surface. The workpiece rests on the first and second workpiece contact surface. It touches the first and second support element at the first and second workpiece contact surface. The angle between the first and second workpiece contact surface is preferably greater than 60° and smaller than 120°. An angle of substantially 90° is especially preferable.

According to a further advantageous embodiment of the invention, the supporting body exhibits a first guide for the first support element. At this first guide, the first support element is displaceable in the first direction of displacement. This first direction of displacement defines a straight line. It is advantageous that the first direction of displacement runs in a plane that is perpendicular to the support body axis.

According to an advantageous embodiment of the invention, the support body exhibits a second guide for the second support element. At this second guide, the second support element is displaceable in the second direction of displacement. This second direction of displacement defines a second straight line. It is advantageous that the second direction of displacement runs in a plane that is perpendicular to the support body axis.

According to an advantageous embodiment of the invention, the angle between the first direction of displacement and the second direction of displacement is more than 0° and less than 180°. The first and second directions of displacement are not parallel. The angle is preferably between 60° and 120°. An angle of substantially 90° is especially preferable.

According to a further advantageous embodiment of the invention, the first straight line that is defined by the first direction of displacement and the second straight line that is defined by the second direction of displacement are part of a plane that is perpendicular to the support body axis.

According to a further advantageous embodiment of the invention, the first guide and/or the second guide take the form of an inclined plane on the support body. The first and/or second support element or an additional component that carries the first and/or second support element moves along this plane in the first or second direction of displacement. This translational movement substantially progresses up or down the inclined plane.

According to a further advantageous embodiment of the invention, the first axis of rotation is substantially perpendicular to the first guide of the first support element. The first axis of rotation is substantially perpendicular to the first direction of displacement, along which the first support element is displaceable at the first guide.

According to a further advantageous embodiment of the invention, the second axis of rotation is substantially perpendicular to the second guide of the second support element. The second axis of rotation is substantially perpendicular to the second direction of displacement, along which the second support element is displaceable at the second guide. The first and second axes of rotation run preferably in a plane and intersect at an angle. This corresponds for example to the angle at which the first and the second guide intersect particularly with the directions of displacement of the first and second guide. The plane is preferably perpendicular to the support body axis of the supporting body.

According to a further advantageous embodiment of the invention, a first carriage is provided and is arranged displaceably in the first direction of displacement at the first guide. The first support element is rotatable in relation to the first carriage. A movement of the first carriage along the first guide results in a linear movement of the first support element in the first direction of displacement.

According to a further advantageous embodiment of the invention, a second carriage is provided and is arranged displaceably in the second direction of displacement at the second guide. The second support element is rotatable in relation to the second carriage. A movement of the second carriage along the second guide results in a linear movement of the second support element in the second direction of displacement.

According to a further advantageous embodiment of the invention, the first support element at least in part takes the form of a carriage that is arranged displaceably along the first guide. The first carriage is therefore part of the first support element.

According to a further advantageous embodiment of the invention, the second support element at least in part takes the form of a carriage that is arranged displaceably along the second guide. The second carriage is therefore part of the second support element.

According to a further advantageous embodiment of the invention, at least one of the two guides is equipped with a guide stop at one end. A spring is arranged on the guide stop. The carriage arranged on the guide is indirectly or directly supported on the spring. If the carriage is moved along the guide from a starting position in which the spring is not deflected, the spring becomes deflected. The deflected spring exerts a force on the carriage that acts parallel to the guide. It pushes the carriage back into its starting position. The spring may for example be a coil spring. A pneumatic spring or a pneumatic drive may also be provided instead of a mechanical spring.

According to a further advantageous embodiment of the invention, at least one of the two support elements exhibits a shoulder with which it is supported on its designated carriage on the end away from the guide stop.

According to a further advantageous embodiment of the invention, the supporting body is equipped with at least one locating device. A position of at least one of the two support elements on the support body can be locked or fixed with the locating device. For example, a first locating device can be provided for the first support element and a second locating device for the second support element.

According to a further advantageous embodiment of the invention, the locating device is a clamping device. This presses the support element in the fixed position against the supporting body and clamps the two together.

According to a further advantageous embodiment of the invention, the support body is in mirror symmetry to a vertical plane of symmetry. The support body axis of the supporting body runs in the plane of symmetry or is parallel to the plane of symmetry.

According to a further advantageous embodiment of the invention, the device exhibits a workpiece pressing element that exerts a force on a workpiece resting on the first and second support element. This workpiece pressing element presses a workpiece against the first and second support element. The workpiece pressing element can also be referred to as a clamping finger.

According to a further advantageous embodiment of the invention, the device is equipped with a workpiece receiving part that rests on the first and second support element. The workpiece receiving part exhibits an elongated recess for the workpiece. The recess is preferably aligned parallel to the spindle axis. To that end, the workpiece receiving part is preferably arranged on the support elements in such a way that the elongated recess is aligned parallel to the support body axis. The workpiece receiving part can be fixed at the support elements, for example with the locating device. In this way, the workpiece receiving part retains its position when a workpiece is exchanged and does not need to be readjusted. If the workpiece receiving part substantially has the shape of a half-cylinder, it may also be referred to as half-moon.

According to a further advantageous embodiment of the invention, the recess for the workpiece in the workpiece receiving part runs substantially parallel to the support body axis.

According to a further advantageous embodiment of the invention, the locating device exhibits a section which presses the workpiece receiving part against the first and/or second support element. In this way, the workpiece receiving part can be fixed in one position.

Further advantages and advantageous embodiments of the invention can be obtained from the following description, the drawing and the claims.

DRAWING

Figure 2:
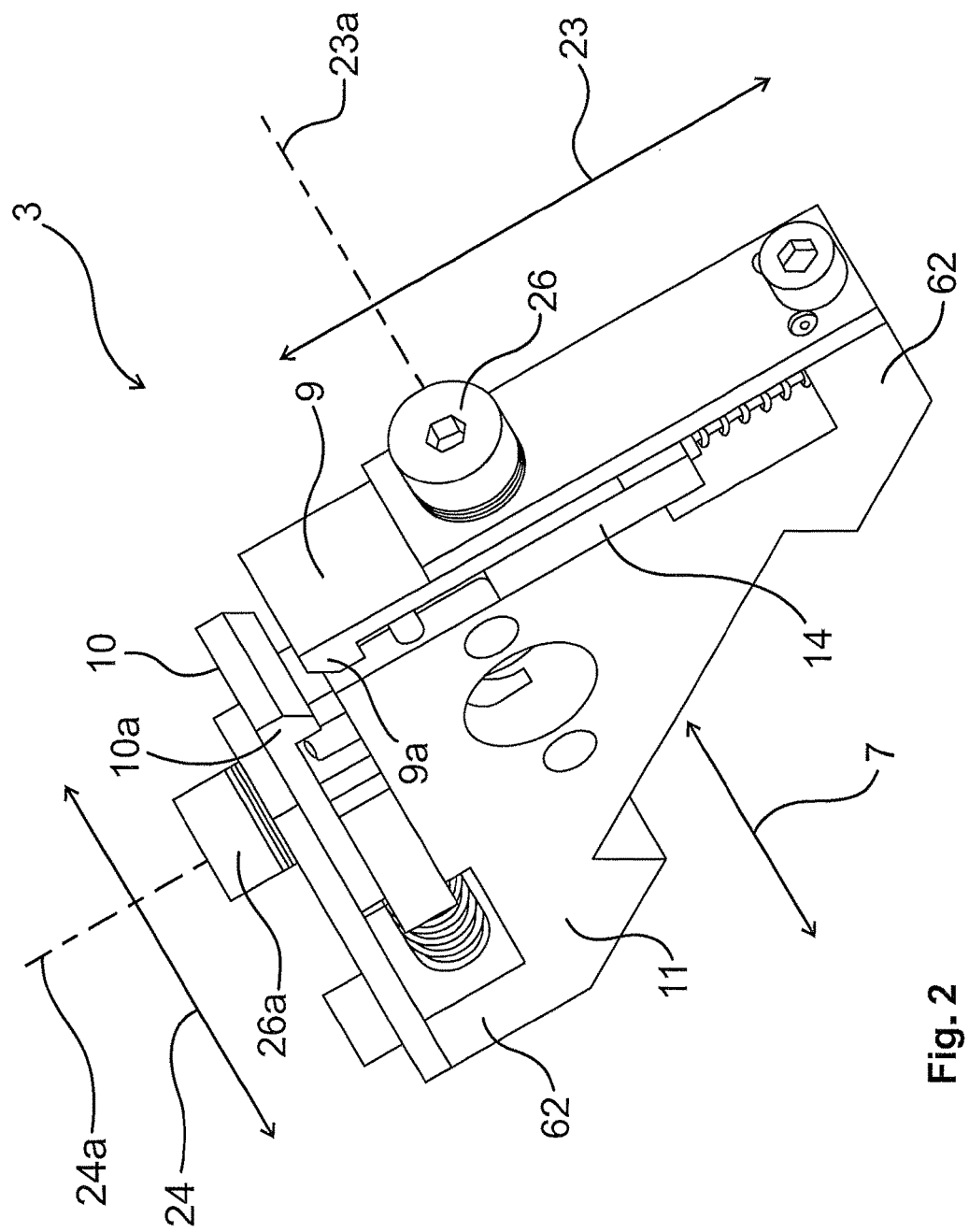
Figure 3:
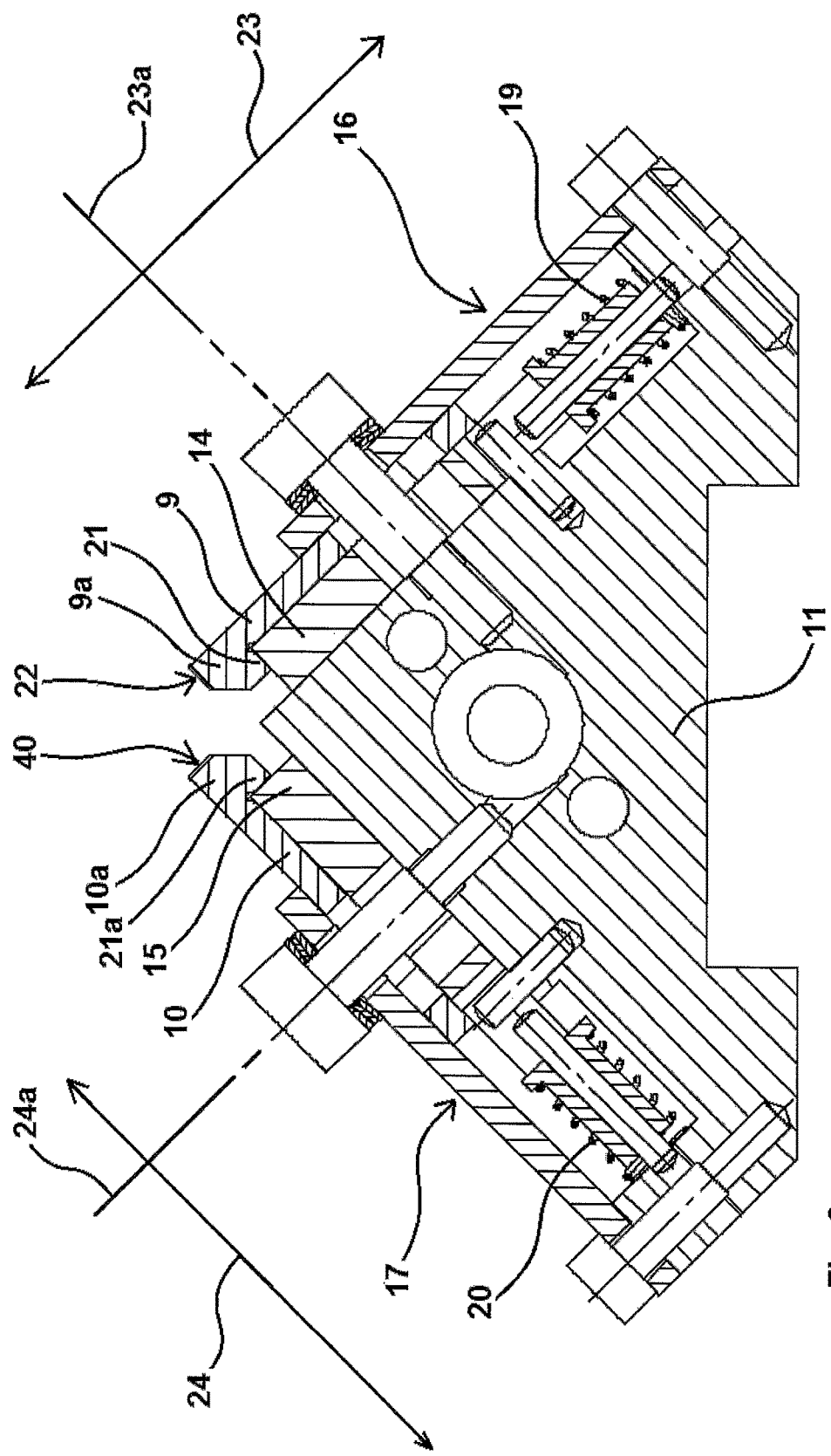
Figure 4:
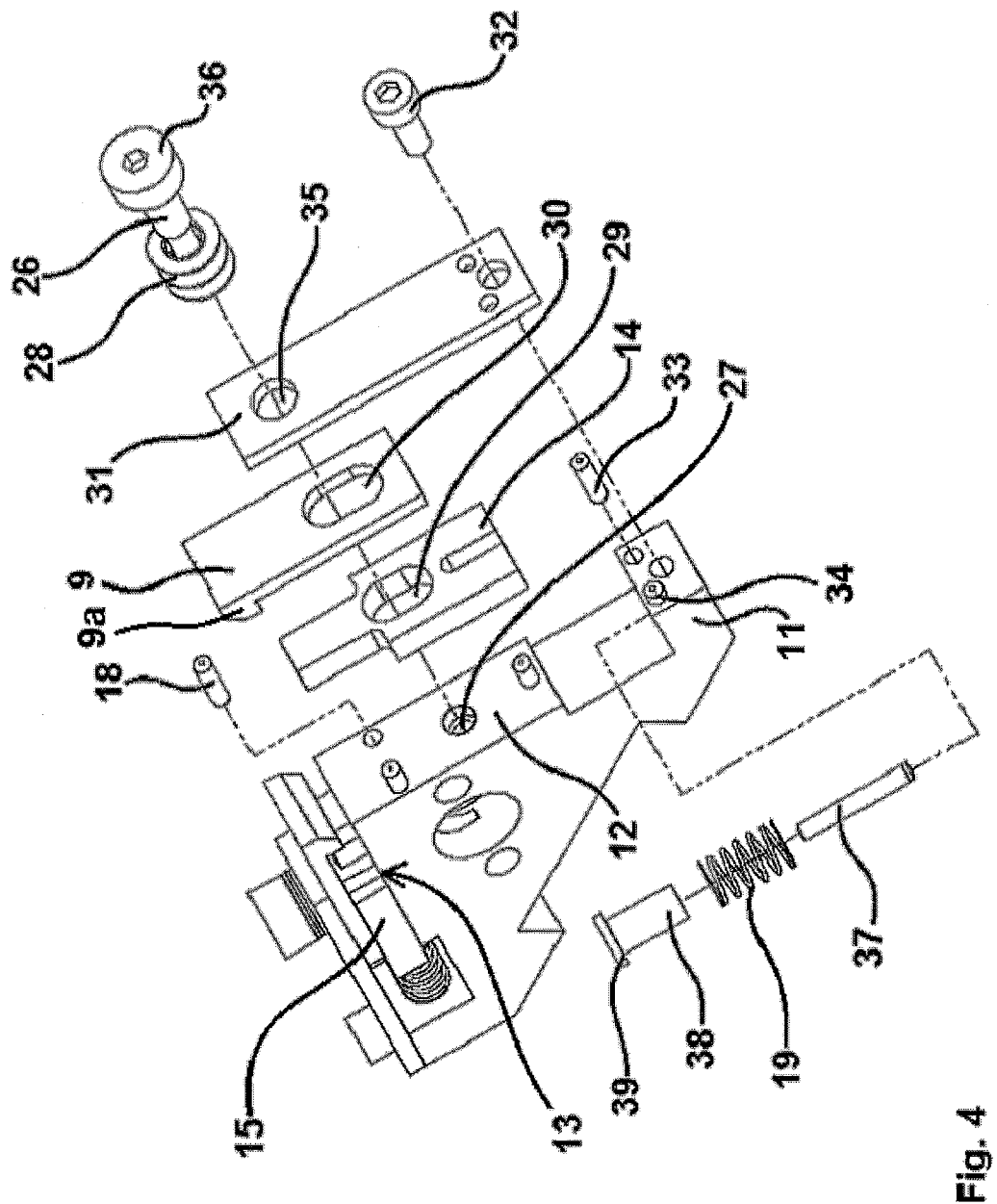
Figure 5:
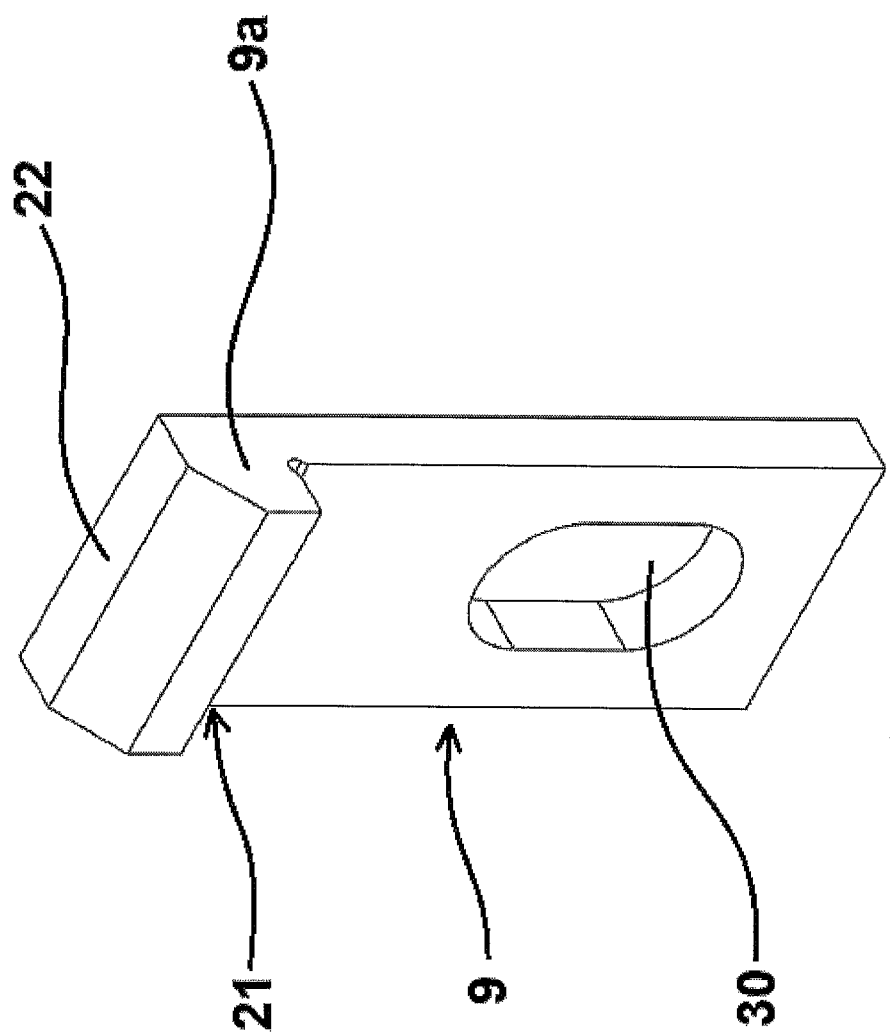
Figure 6:
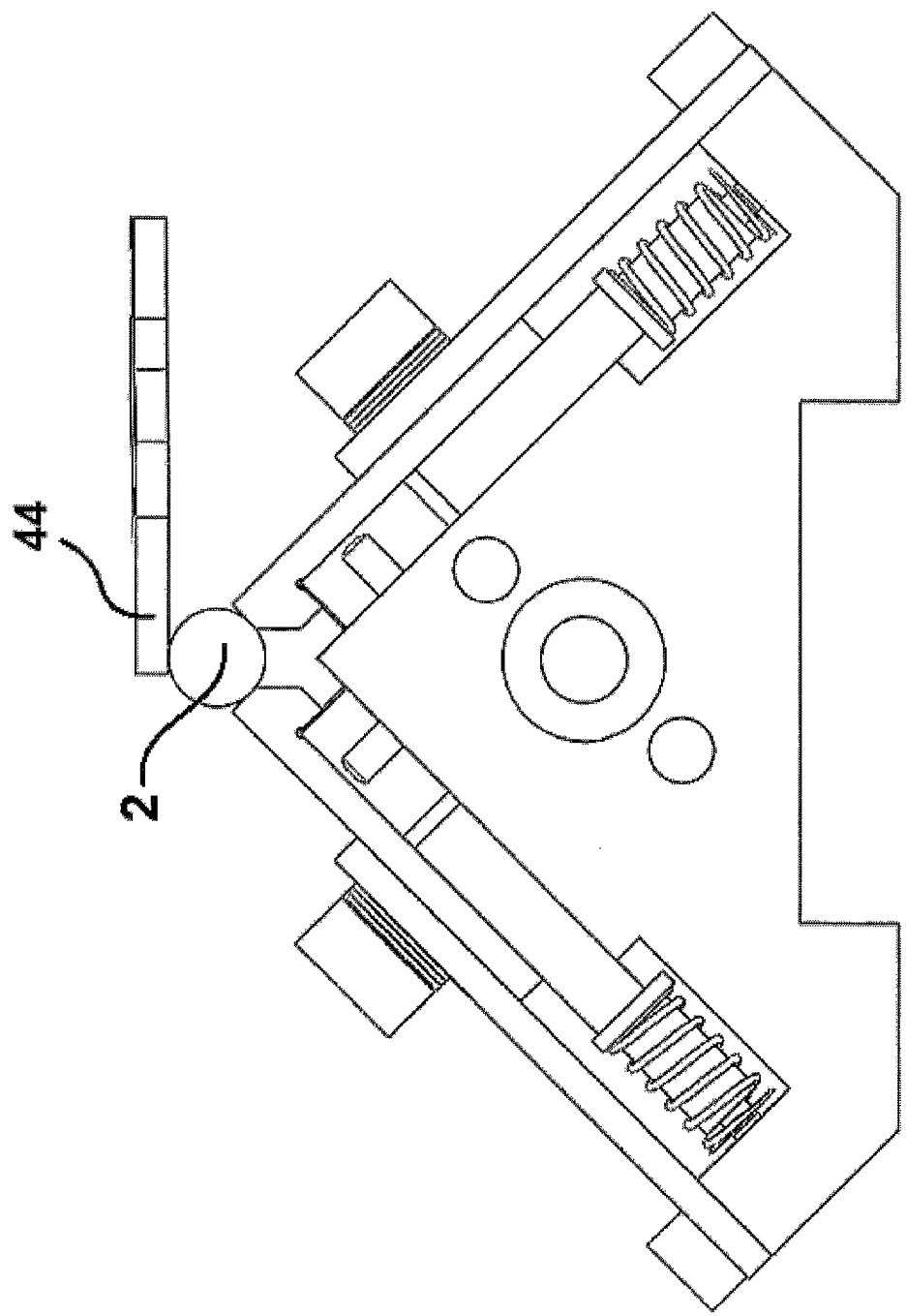
Figure 7:
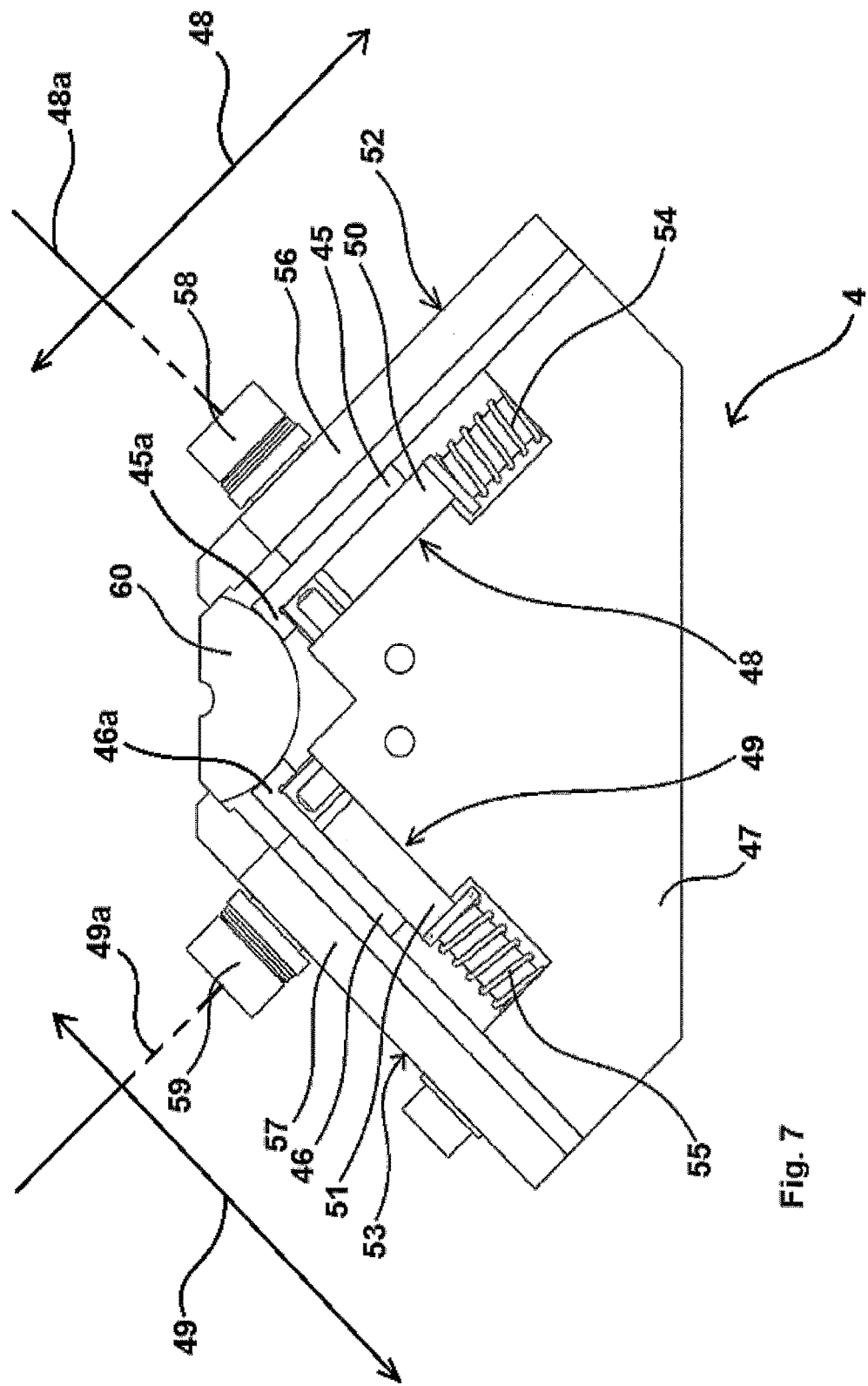
Figure 8:
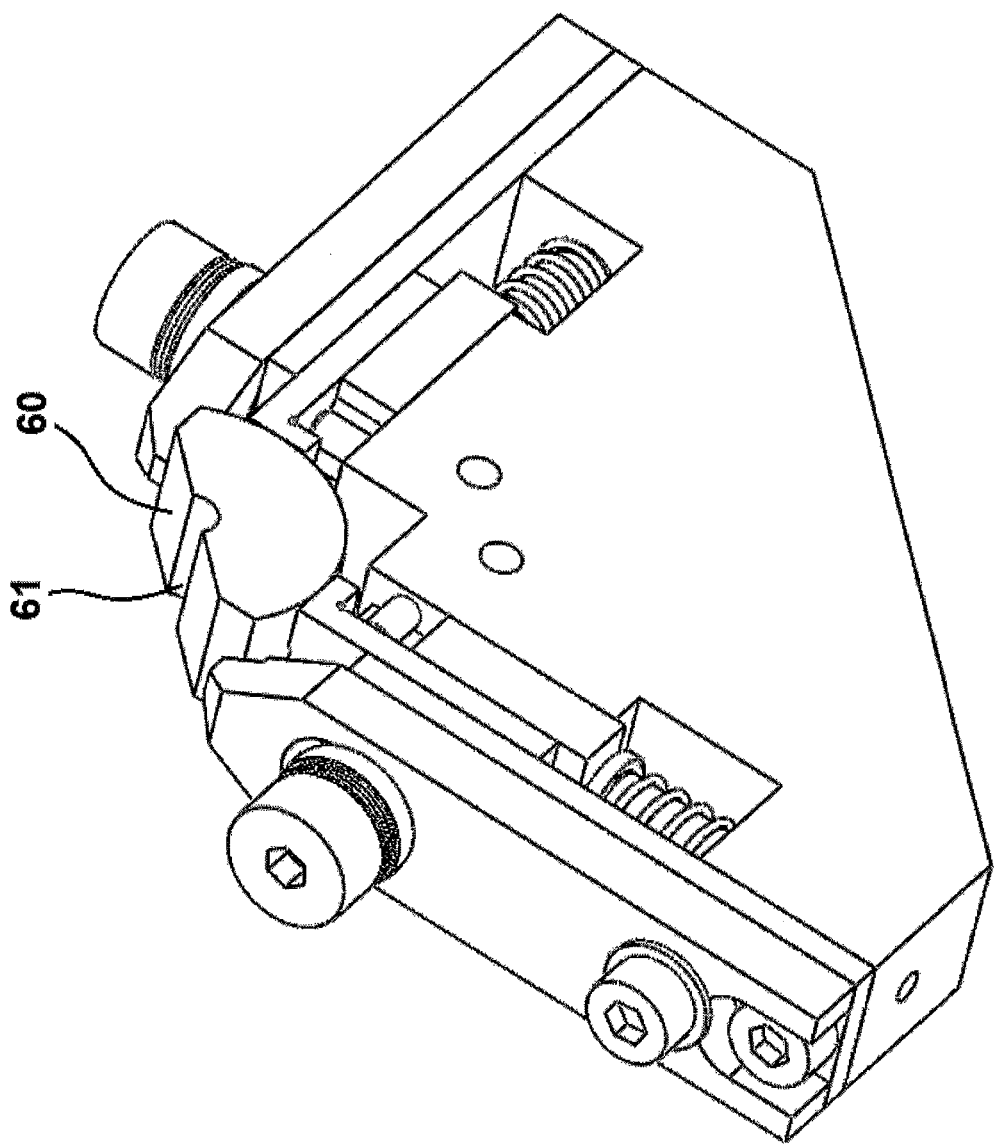
Figure 9:
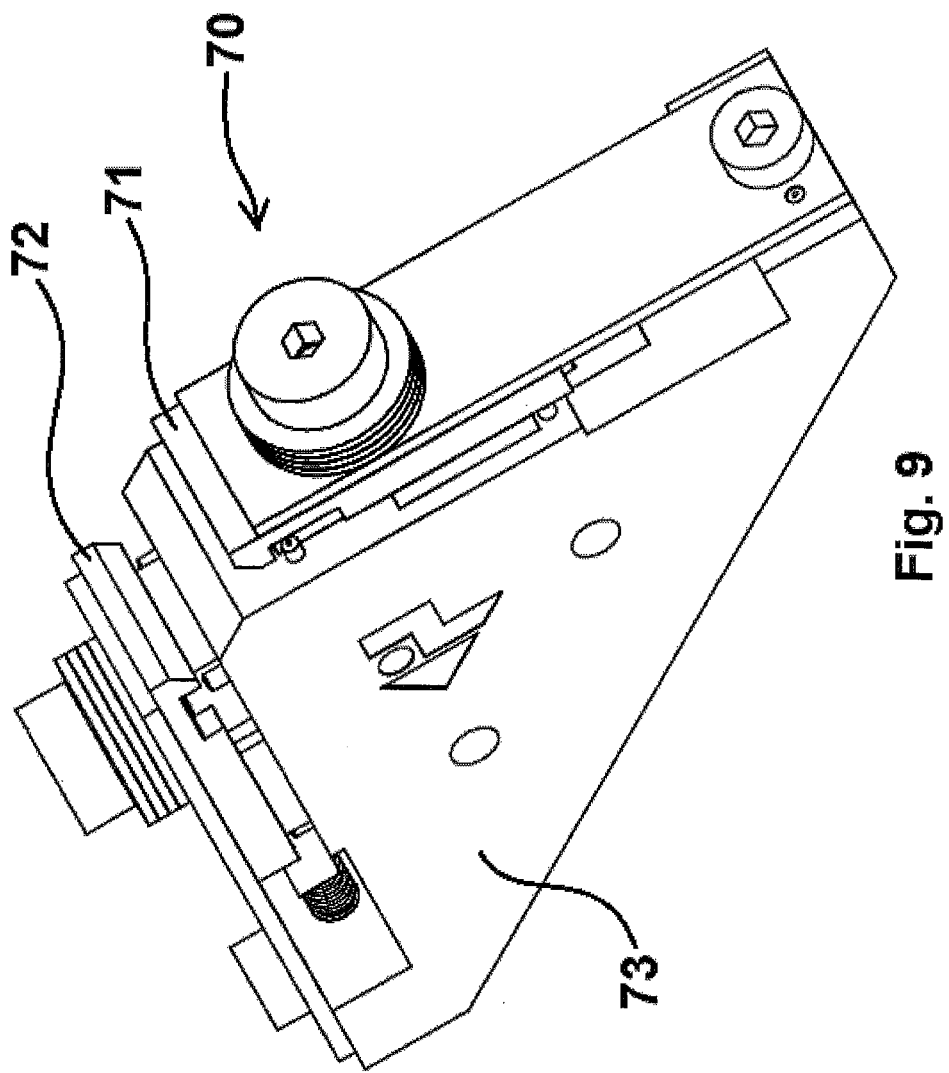
Figure 10:
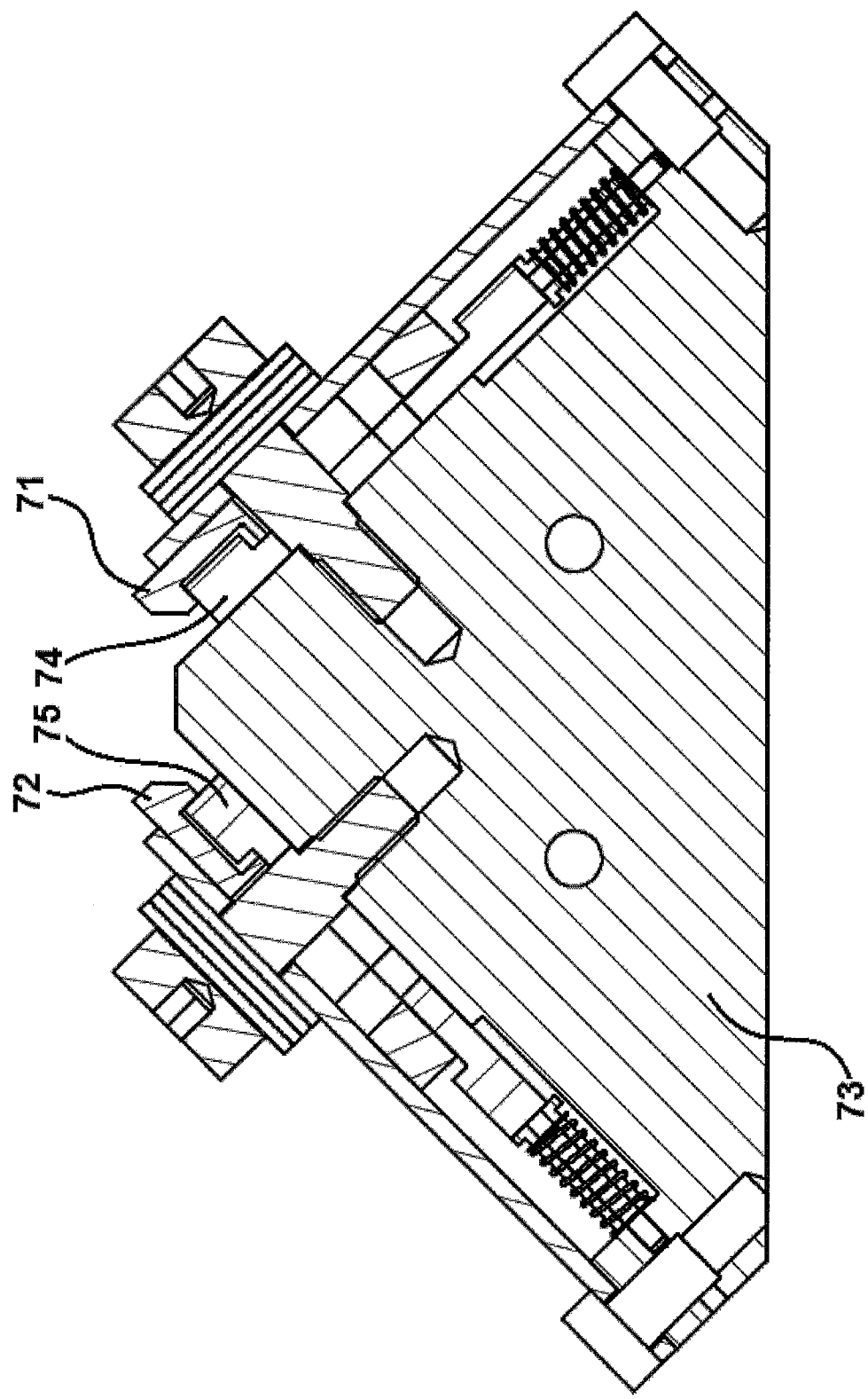
Figure 11:
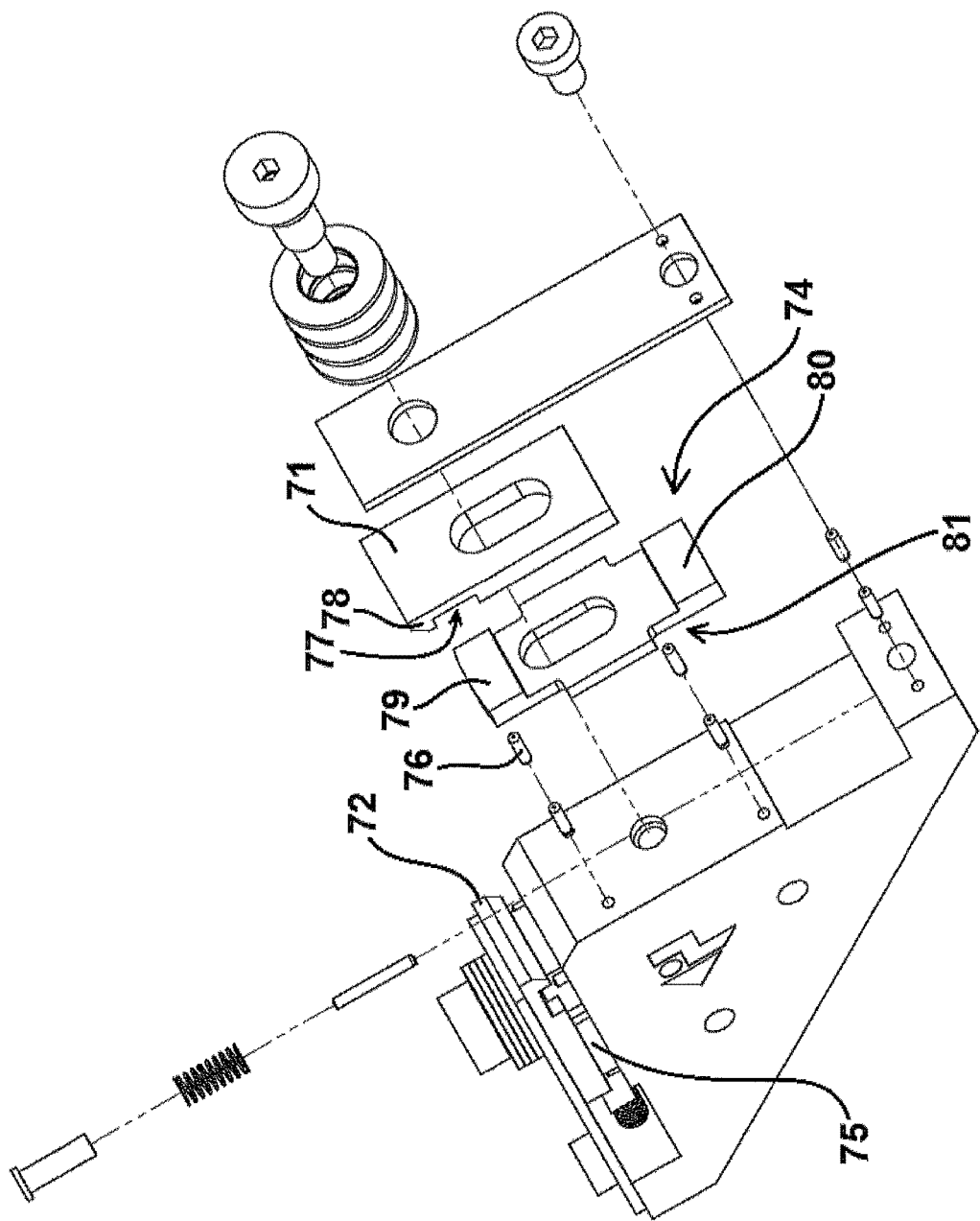
Figure 12:
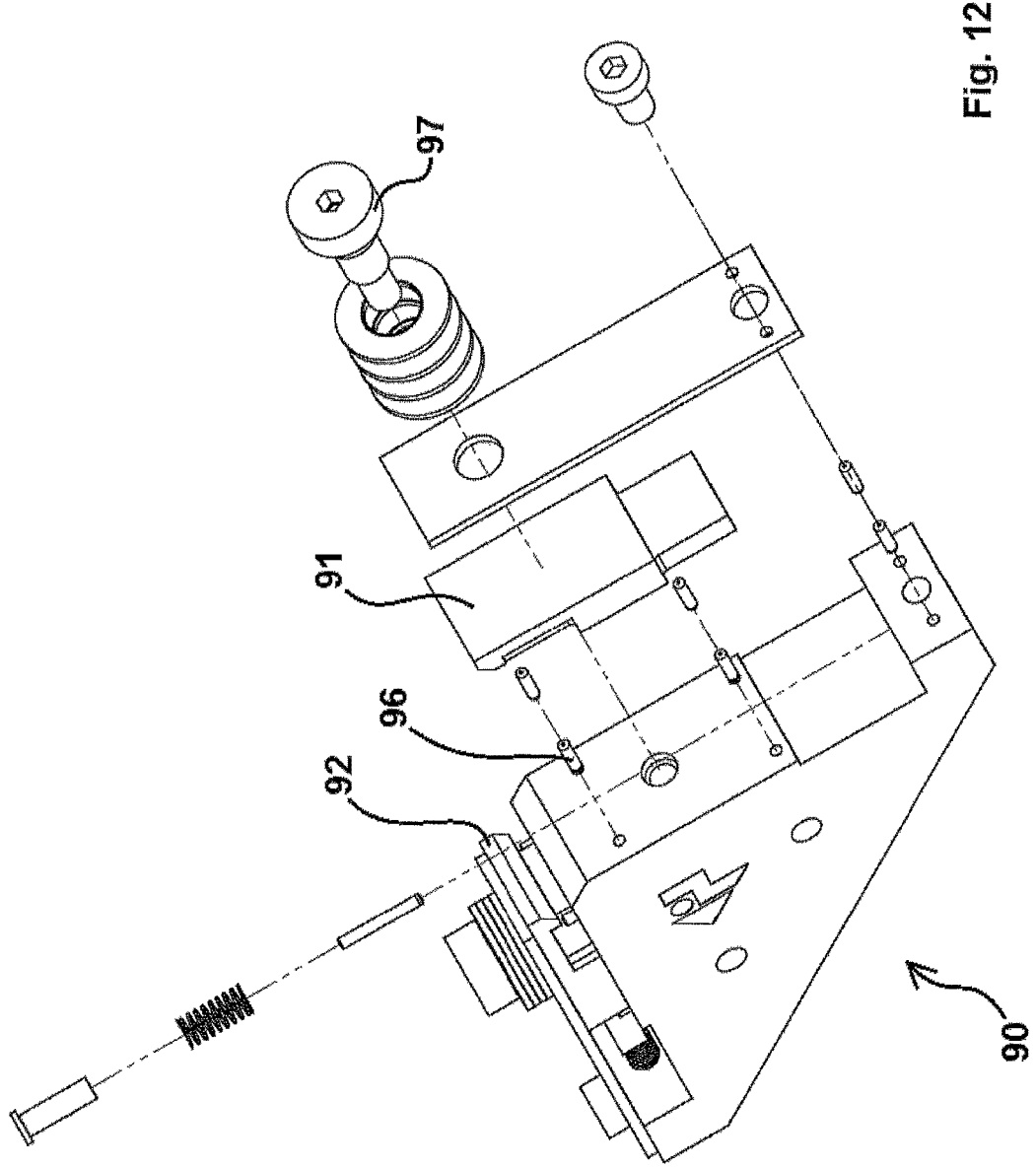
Figure 13:
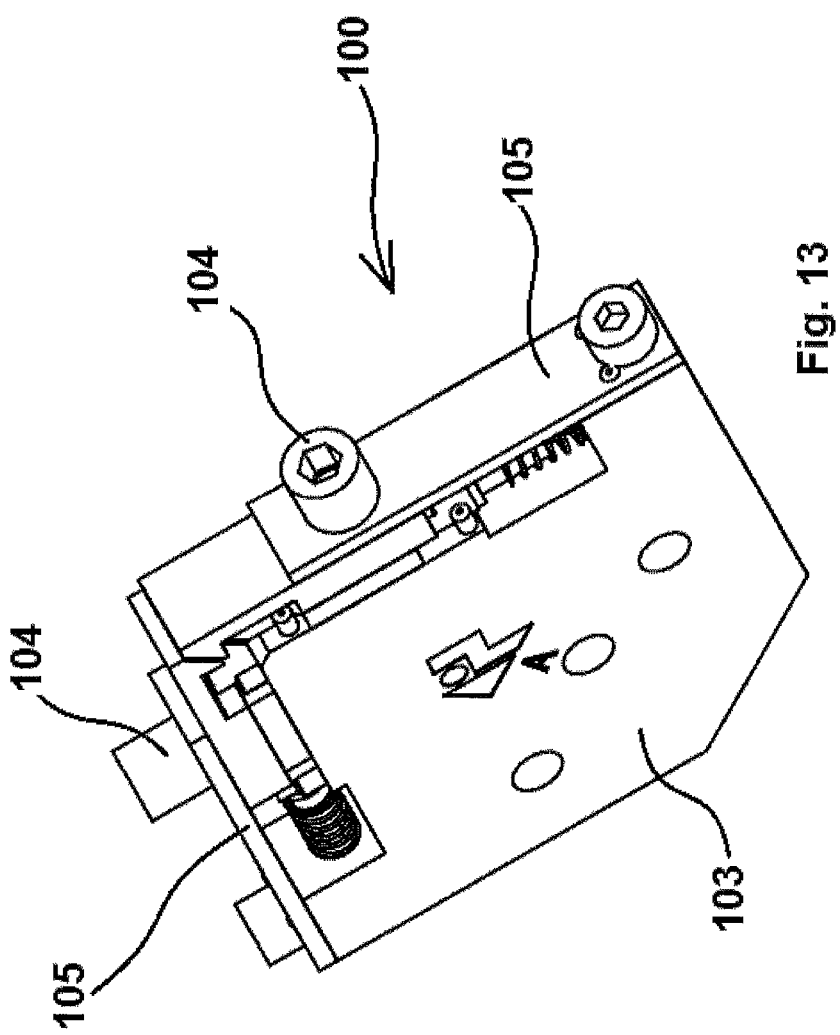
Figure 14:
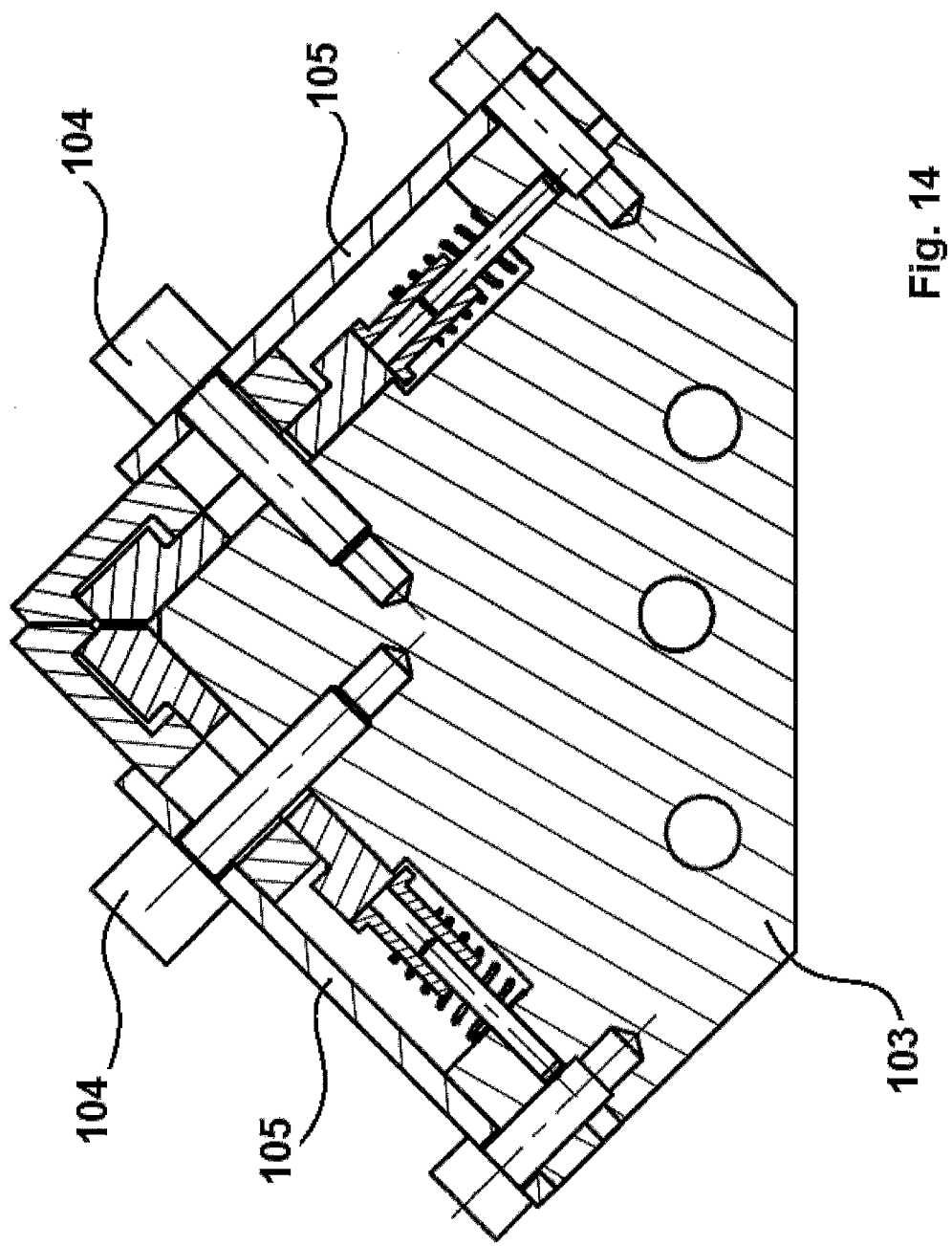
Figure 15:
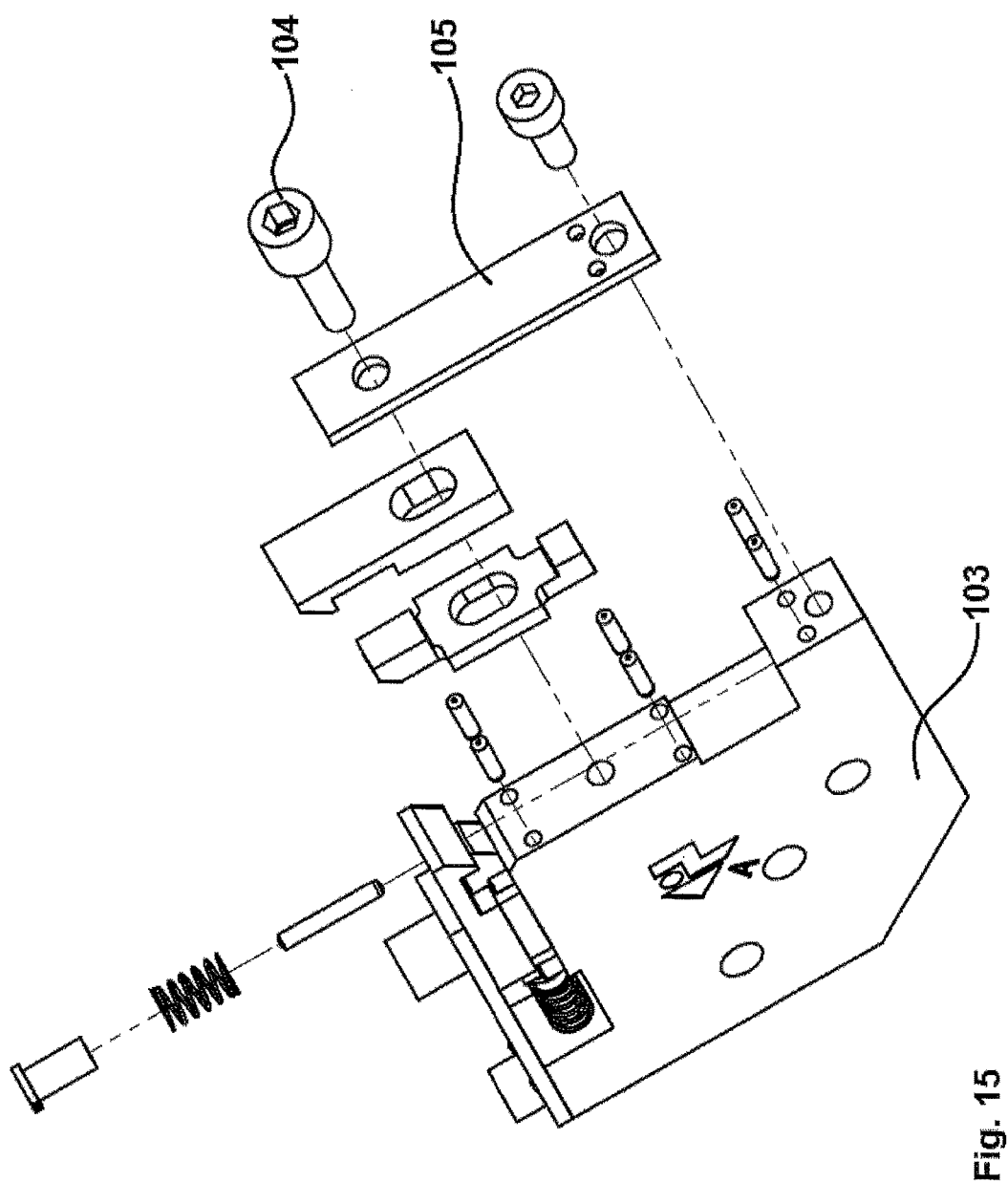
Figure 16:
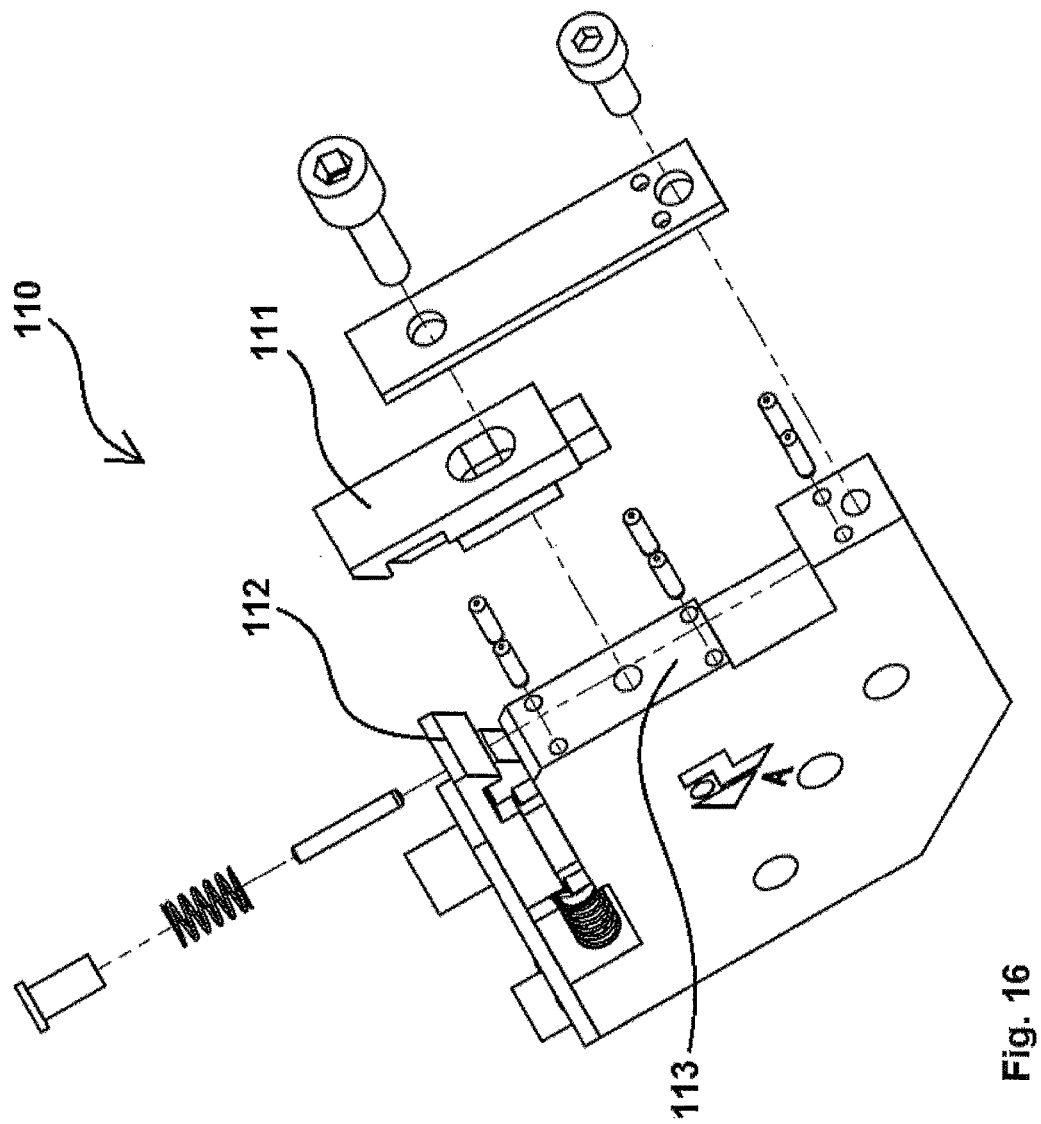

The drawing shows six model embodiments of a device for workpiece centring. Illustrations:

FIG. 1 Spindle with workpiece and several devices for workpiece centring in a side view, FIG. 2 First model embodiment of a device for workpiece centring in a perspective view, FIG. 3 Device for workpiece centring according to FIG. 2 in a cross-section view, FIG. 4 Device according to FIG. 2 in an exploded view, FIG. 5 First support element of the device according to FIG. 2 in a perspective view, FIG. 6 Device according to FIG. 2 with workpiece, FIG. 7 Second model embodiment of a device for workpiece centring, front view, FIG. 8 Device for workpiece centring according to FIG. 7 in a perspective view, FIG. 9 Third model embodiment of a device for workpiece centring in a perspective view, FIG. 10 Device for workpiece centring according to FIG. 9 in a cross-section view, FIG. 11 Device for workpiece centring according to FIG. 9 in an exploded view, FIG. 12 Fourth model embodiment of a device for workpiece centring in an exploded view, FIG. 13 Fifth model embodiment of a device for workpiece centring in a perspective view, FIG. 14 Device for workpiece centring according to FIG. 13 in a cross-section view, FIG. 15 Device for workpiece centring according to FIG. 13 in an exploded view, FIG. 16 Sixth model embodiment of a device for workpiece centring in an exploded view,

DESCRIPTION OF THE MODEL EMBODIMENTS

FIG. 1 shows a spindle 1 with a workpiece 2 and several devices 3, 4, 5 for workpiece centring. The first device 3 for workpiece centring is arranged adjacent to the clamping unit 6 of spindle 1. The distance from the spindle can only be changed to a minor extent. The second device 4 and the third device 5 exhibit a greater distance from the clamping unit 6. They can be displaced along a support body axis 7. All three devices 3, 4, 5 have the purpose of bringing the longitudinal axis of the workpiece 2 in alignment with the axis of rotation 8 of the spindle 1. The support body axis 7 is substantially parallel to the axis of rotation 8 of the spindle. The three devices 3, 4 and 5 are shown in greater detail in the FIGS. 2 to 7.

FIGS. 2 to 6 show a first model embodiment of a device 3 for centring a workpiece. The workpiece is not shown in the FIGS. 2 to 5. It is only identifiable in FIG. 6. The device 3 exhibits a first support element 9, a second support element 10, a support body 11 supporting the two support elements 9, 10 with a first guide 12 and a second guide 13, a first carriage 14, a second carriage 15, a first locating device 16 and a second locating device 17. Two of the surfaces of the support body 11 take the form of guides: a first guide 12 for the first carriage 14 and a second guide 13 for the second carriage 15. The surfaces of the support body 11 taking the form of guides are level surfaces. They each form an inclined plane along which the first carriage 14 and the second carriage 15 move. The surface of the first and second carriage resting on the first and second guide is equally a level surface. Guide pins 18 are arranged at the guides 12, 13. They act as a lateral guide for the carriages 14, 15. A centrally arranged pin limits the displacement path of the carriages 14, 15 at the guides 12, 13. It equally acts as a guide. The two carriages 14, 15 take the form of flat components that can slide up and down on the guides 12, 13. They can only move forward and back in one direction.

The support body is equipped with guide stops 62. A guide stop 62 is assigned to each guide 12, 13. A spring 19, 20 is arranged on each of the two guide stops 62. The springs are secured by a pin 37 and a sleeve 38 at the corresponding guide stop. With their bottom end, the two carriages 14, 15 are each supported on a spring 19, 20. The end of the springs 19, 20 that faces away from the carriages 14, 15 is supported on the corresponding guide stop 62 of the support body 11.

If the two carriages 14, 15 are moved downwards, the springs 19, 20 are compressed. A corresponding spring force acts on the carriages 14, 15.

The first support element 9 is arranged at the first carriage 14. It equally takes the form of a flat component and rests at least in part on the first carriage 14. The first support element 9 exhibits a shoulder 21 with which it is supported on the first carriage 14. The shoulder 21 rests on the end of the first carriage 14 that faces away from the spring 19.

The shoulder 21 separates a first support section 9a from the remainder of the first support element 9. The first support section 9a has an elongated shape. Its longitudinal direction is parallel to the support body axis 7 in the starting position of the first support element 9 shown in the FIGS. 2 and 3. A workpiece 2 rests at the first support section 9a and a corresponding second support section 10a of the second support element. This is shown in FIG. 6.

There is a first workpiece contact surface 22 of the first support element 9 on the side of the support section 9a facing away from the shoulder 21. This is part of the surface of the support section 9a. At the workpiece contact surface, the workpiece 2 touches the support element 9. The workpiece contact surface 22 here forms a tangential plane relative to the workpiece 2.

The first support element 9 together with the first carriage 14 is displaceable along the first guide 18 in the first direction of displacement 23. In addition, the first support element 9 can be rotated relative to the first carriage 14 about a first axis of rotation 23a. The first axis of rotation 23a is perpendicular to the first direction of displacement 23. The first axis of rotation 23a is defined by a screw 26, which is held in a threaded hole 27 of the supporting body 11. The first carriage 14 exhibits a slot 29, so that it can be displaced relative to the screw 26. The first support element 9 exhibits a slot 30, so that it can likewise be displaced relative to the screw 26. In addition, the first support element 9 can be rotated relative to the screw 26.

The screw 26 also has a second function. It is part of the first locating device 16. This in addition exhibits a leaf spring 31, which is firmly clamped on one end on the supporting body 11 by means of a screw 32 and two pins 33, 34. The other end of the leaf spring 31 exhibits a passage 35 through which the screw 26 is guided. The screw 26 exhibits a screw head 36 and, directly adjacent to the screw head, a spring 28. To adjust the position of the first and second support element 9, 10 the screw 26 is slackened off so that the leaf spring 31 can be deflected. To fix a position of the first support element 9, the screw is turned into the threaded hole 27 until the screw head 36 of the screw 26 compresses the spring 28 and the leaf spring 31 presses against the first support element 9, the first carriage 14 and the first guide 12 of the support body 11. This clamps the first support element 9 with the support body 11.

The spring 19 is held against the support body 11 by a pin 37 and a sleeve 38 with a sleeve head 39 fitted on the pin 37.

In the same way as the first support element 9, the second support element 10 exhibits a second elongated support section 10a. This section is separated from the remainder of the second support element 10 by the shoulder 21a. The side of the second support section 10a facing away from the shoulder 21a takes the form of a second workpiece contact surface 40. In the starting position of the second support element 10 shown in the FIGS. 2 and 3, the second support section 10a is aligned with its longitudinal direction parallel to the support body axis 7.

The second support element 10, the second guide 13, the second carriage 15 and the second locating device 17 are entirely identical in construction and exhibit the same components as the first support element 9, the first guide 12, the first carriage 14 and the first locating device 16. In that respect the device is symmetrical in structure. At least to some extent, the same reference numbers are used in the drawing for the components that are identical. The second support element can be displaced along the second guide 13 in a second direction of displacement 24 and be rotated about a second axis of rotation 24*a*. The second axis of rotation 24*a* is defined by a second screw 26*a*.

In FIG. 6, the device 3 according to the first model embodiment is shown in a view from the front together with a workpiece 2 and a workpiece pressing element 44. The workpiece pressing element 44 exerts a force on the workpiece 2 and presses it against the rest that is formed by the first support element 9 and the second support element 10. Here, the workpiece 2 rests on the first workpiece contact surface of the first support element 9 and on the second workpiece contact surface of the second support element 10. The workpiece 2 is clamped in this way. The force of the workpiece pressing element 44 is transferred to the two support elements 9, 10 and the corresponding carriages 14, 15 together with the weight force of the workpiece 2. To guarantee high repeat accuracy of the position of the workpieces, the support elements 9, 10 and the corresponding carriages may not move under the influence of the force of the workpiece pressing element 44 and the weight force of a workpiece 2.

A reference workpiece that substantially corresponds to the workpiece 2 in the drawing is used to adjust the first and second support element 9, 10 and the first and second carriage 14, 15. The support elements 9, 10 are aligned at an angle that corresponds to the position of the reference workpiece. The first and second carriage 14, 15 are correspondingly moved downwards. The springs 19, 20 are compressed. The spring force of these deflected springs 19, 20 acts against the reference workpiece. If the forces cancel each other out, there is an equilibrium of forces. The set position of the first support element 9 and second support element 10 is fixed with the two locating devices 16, 17. This adjustment of the two support elements 9, 10 and of the carriages 14, 15 can also be described as the setup. The arrangement is only changed if other workpieces of a different geometry are used. The fixed position of the two support elements 9, 10 is used for further workpieces that are placed on the spindle in the place of the reference workpiece.

In the first model embodiment, the angle between the first guide 12 and the second guide 13 is 90°. The angle of the first guide 12 from horizontal is 45°. The angle of the second guide 13 from horizontal is 45°. The structure of the device 3 is substantially in mirror symmetry to a vertical plane of symmetry. FIGS. 7 and 8 show a second model embodiment of a device 4 for workpiece centring. This is a model embodiment that corresponds to the second and third device in FIG. 1.

The structure is substantially identical to the first model embodiment. The device equally exhibits a first support element 45 with a first support section 45*a*, a second support element 46 with a second support section 46*a*, a support body 47 supporting the two support elements 45, 46 with a first guide taking the form of an inclined plane and a second guide taking the form of an inclined plane, a first carriage 50, a second carriage 51, a first locating device 52 and a second locating device 53. The first support section 45*a* is aligned perpendicular to the remainder of the first support element. The second support section 46*a* is aligned perpendicular to the remainder of the second support element. The first support element 45 can be displaced along the first direction of displacement 48 thanks to the guide and be rotated about a first axis of rotation 48*a*. The second support element 46 can be displaced along the second direction of displacement 49 thanks to the guide and be rotated about a second axis of rotation 49*a*. The support body 47 equally exhibits a substantially triangular shape. The structure of the carriage guide with springs 54, 55 and the locating device with leaf springs 56, 57 and screws 58, 59 substantially corresponds to the first model embodiment according to FIGS. 2 to 6. There are two fundamental differences from the first model embodiment:

A workpiece receiving part 60 with a cylindrical recess 61 for a workpiece is provided. The recess 61 has the form of an elongated well. It extends from one end of the workpiece receiving part to the other end. The workpiece receiving part 60 substantially exhibits the shape of half a circular cylinder. The surface that faces downwards is round. The workpiece receiving part is bevelled at the sides. The workpiece receiving part rests on the first support element 45 and the second support element 46.

The second difference from the first model embodiment is that the leaf springs 56, 57 of the locating devices 52, 53 are tapered at the end opposite the firmly clamped end, and extend as far as the workpiece receiving part 60. As the workpiece receiving part 60 is flattened on the sides facing the tapered ends of the leaf springs 56, 57 and the leaf springs extend as far as the flattened sides, the leaf springs can fix not only the position of the support elements 45, 46 but also the position of the workpiece receiving part 60. The leaf springs press against the workpiece receiving part 60 from both sides.

FIGS. 9 to 11 show a third model embodiment of a device 70 for workpiece centring. It differs from the first model embodiment with regard to the shape of the first support element 71, the second support element 72, the support body 73, the first carriage 74, the second carriage 75 and the position of the guide pins 76 for guiding the translational movement of the first and second carriage 74, 75. All other components correspond to the first model embodiment; for that reason they are not given reference numbers in the drawing and are not explained in detail in the following. Reference is made in this connection to the drawing description for the FIGS. 2 to 6. The first support element 71 exhibits an additional recess 77 on the side facing the first carriage 74. It directly adjoins the shoulder 78 with which the first support element 71 is supported on the first carriage 74. Unlike the first carriage of the first model embodiment, on the side facing the first support element 71 the first carriage 74 exhibits two shoulders 79, 80 which protrude towards the first support element 71. In its assembled state, the first support element 71 rests on the first carriage 74. The first shoulder 79 of the first carriage 74 is then arranged in the recess. The extension of the first shoulder 79 in the longitudinal direction of the first carriage 74 is less than the extension of the recess in the longitudinal direction of the carriage 74 or of the first support element 71. There is sufficient play between the first shoulder 79 and the recess for the rotation of the first support element 71 and the first carriage 74 not to be obstructed. The second shoulder 80 of the first carriage 74 adjoins the end of the first support element 71 facing the shoulder 78.

Unlike the first model embodiment, the support body 73 is flattened on its upper side and there is no incision on its entire lower side. Like the first model embodiment, the support body 73 exhibits a substantially triangular shape.

Unlike the first model embodiment, in the third model embodiment there are four guide pins 76 provided to guide the translational movement of the first carriage 74. The position of the guide pins also influences the shape of the first carriage. Incisions 81 for the guide pins are provided on the sides of the first carriage 74. They act as guides along the guide pins 76 in a translational movement of the first carriage 74 and limit the displacement path.

On the third model embodiment, the second support element 72, the second carriage 75 and the corresponding guide pins have a matching design to the first support element 71, the first carriage 74 and the corresponding guide pins.

FIG. 12 shows a fourth model embodiment of a device 90 for workpiece centring. This device substantially corresponds to the device 70 of the third model embodiment. The only difference is that the first support element 71 and the first carriage 74 are two separate components in the third model embodiment. On the device 90 of the fourth model embodiment, the first support element 91 and the first carriage form a single component. The carriage is therefore part of the first support element 91. In this instance the first support element 91 performs both a translational movement along the guide pins 96 and a rotational movement about the screw 97. There must be sufficient play between the first support element 91 and the guide pins 96 to ensure that the rotational movement is not impeded by the guide pins 96. The same applies to the second support element 92. It likewise has a one-piece design with a carriage.

FIGS. 13 to 15 show a fifth model embodiment of a device 100 for workpiece centring. It substantially corresponds to the device 70 of the third model embodiment. The device 100 differs from this device 70 with regard to the shape of the support body 103. This has a substantially rectangular shape with a bevel at one of the corners. A further difference compared with the first and third model embodiment is that the head of the screws 104 is supported directly on the leaf spring 105 of the locating device, instead of via a spring.

FIG. 16 shows a sixth model embodiment of a device 110 for workpiece centring. It corresponds to the device 100 of the fifth model embodiment with the exception that the first and second support element 111 and 112 in part take the form of a carriage which slides on the guides 113 which take the form of an inclined plane. Only the guide 113 assigned to the first support element 111 can be identified in the drawing. The guide assigned to the second support element 112 has a corresponding design. While the first support element and the first carriage comprise two separate components in the fifth model embodiment, the first support element 111 and the first carriage form one component in the sixth model embodiment. The same applies to the second support element 112.

All features of the invention can be material to the invention both individually and in any combination.

REFERENCE NUMBERS

1 Spindle
2 Workpiece
3 First device for workpiece centring
4 Second device for workpiece centring
5 Third device for workpiece centring
6 Clamping unit
7 Support body axis
8 Axis of rotation of the spindle
9 First support element
9a First support section
10 Second support element
10a Second support section
11 Support body
12 First guide
13 Second guide
14 First carriage
15 Second carriage
16 First locating device
17 Second locating device
18 Guide pin
19 Spring
20 Spring
21 First shoulder
21a Second shoulder
22 First workpiece contact surface
23 First direction of displacement
23a First axis of rotation
24 Second direction of displacement
24a Second axis of rotation
25
26 First screw
26a Second screw
27 Threaded hole
28 Spring
29 Slot
30 Slot
31 Leaf spring
32 Screw
33 Pin
34 Pin
35 Passage
36 Screw head
37 Pin
38 Sleeve
39 Sleeve head
40 Second workpiece contact surface
41
42
43
44 Workpiece pressing element
45 First support element
46 Second support element
47 Support body
48 First direction of displacement
8a First axis of rotation
49 Second direction of displacement
49a Second axis of rotation
50 First carriage
51 Second carriage
52 First locating device
53 Second locating device
54 Spring
55 Spring
56 Leaf spring
57 Leaf spring
58 Screw
59 Screw
60 Workpiece receiving part
61 Recess
62 Guide stop
70 Device for workpiece centring
71 First support element
72 Second support element
73 Support body
74 First carriage
75 Second carriage
76 Guide pin 77 Recess
78 Shoulder
79 Shoulder
80 Shoulder
90 Device for workpiece centring
91 First support element
92 Second support element
96 Guide pin
97 Screw
100 Device for workpiece centring
103 Support body
104 Screw
105 Leaf spring
110 Device for workpiece centring
111 First support element
112 Second support element
113 Guide

The invention claimed is:

1. A device for workpiece centering of a longitudinal workpiece fixed on a spindle, the device comprising:
    a support body which can be linearly displaced along a support body axis, wherein the support body and the support body axis can be aligned substantially parallel to an axis of rotation of the spindle;
    a first support element, which is displaceably arranged on the support body and which supports the workpiece or a workpiece receiving part that receives the workpiece from a first side; and
    a second support element, which is displaceably arranged on the support body and which supports the workpiece or a workpiece receiving part from a second side,
    wherein the first support element is arranged to be linearly displaceable in a first direction of displacement and to be rotatable about a first axis of rotation on the support body,
    wherein the second support element is arranged to be linearly displaceable in a second direction of displacement, which is different from the first direction of displacement, and to be rotatable about a second axis of rotation on the support body,
    wherein the angle between the first axis of rotation and the support body axis is greater than 0° and smaller than 180°,
    wherein the angle between the second axis of rotation and the support body axis is greater than 0° and smaller than 180°,
    wherein the first support element comprises a first elongated support section, on which the workpiece or a workpiece receiving part that receives the workpiece rests,
    wherein the second support element comprises a second elongated support section, on which the workpiece or a workpiece receiving part that receives the workpiece rests, and
    wherein the first support section and the second support section can be aligned parallel to each other and parallel to the support body axis of the support body in their longitudinal direction.

2. The device according to claim 1, wherein the first support element comprises a substantially level first workpiece contact surface, wherein the second support element comprises a substantially level second workpiece contact surface and wherein an angle between the first workpiece contact surface and the second workpiece contact surface is greater than 0° and smaller than 180°.

3. The device according to claim 1, wherein the support body comprises a first guide on which the first support element is displaceable in the first direction of displacement.

4. The device according to claim 1, wherein the support body comprises a second guide on which the second support element is displaceable in the second direction of displacement.

5. The device according to claim 1, wherein the first axis of rotation is substantially perpendicular to the first direction of displacement.

6. The device according to claim 1, wherein the second axis of rotation is substantially perpendicular to the second direction of displacement.

7. The device according to claim 1, wherein a first carriage is provided which is arranged displaceably on a first guide in the first direction of displacement, and wherein the first support element can be rotated relative to the first carriage about the first axis of rotation.

8. The device according to claim 1, wherein a second carriage is provided which is arranged displaceably on a second guide in the second direction of displacement, and wherein the second support element can, be rotated relative to the second carriage about the second axis of rotation.

9. The device according to claim 7, wherein at least one of the two support elements comprises a shoulder, with which the at least one of the two support elements is supported on a designated carriage.

10. The device according to claim 1, wherein at least one of the two guides is equipped with a guide stop at one end, wherein a spring is arranged at the guide stop, and wherein a carriage arranged at the guide is supported on the spring.

11. The device according to claim 1, wherein the support body comprises at least one locating device for fixing at least one of the two support elements to the support body.

12. The device according to claim 11, wherein the locating device is a clamping device which presses the support element against the support body in a fixed position.

13. The device according to claim 1, wherein the workpiece receiving part rests on the first and second support element and comprises a recess for the workpiece.

14. The device according to claim 11, wherein the locating device comprises a section which presses the workpiece receiving part against the first and/or second support element.

15. The device according to claim 1, further comprising a workpiece pressing element which exerts a force on a workpiece resting on the first and second support element to clamp the workpiece.

16. The device according to claim 1, wherein the first direction of displacement runs in a first plane and
    the second direction of displacement runs in a second plane such that the first and second planes are identical or parallel.

* * * * *